(12) United States Patent
Diab

(10) Patent No.: US 9,009,499 B2
(45) Date of Patent: Apr. 14, 2015

(54) POWER MANAGER FOR A NETWORK HAVING A VIRTUAL MACHINE

(75) Inventor: Wael William Diab, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 850 days.

(21) Appl. No.: 12/813,072

(22) Filed: Jun. 10, 2010

(65) Prior Publication Data

US 2011/0307715 A1 Dec. 15, 2011

(51) Int. Cl.
*G06F 1/00* (2006.01)
*G06F 9/50* (2006.01)
*G06F 1/32* (2006.01)
*H04L 12/12* (2006.01)
*G06F 9/455* (2006.01)

(52) U.S. Cl.
CPC ............ *G06F 1/3203* (2013.01); *G06F 9/5094* (2013.01); *Y02B 60/148* (2013.01); *Y02B 60/35* (2013.01); *G06F 2009/45595* (2013.01); *Y02B 60/43* (2013.01); *Y02B 60/142* (2013.01); *H04L 12/12* (2013.01); *G06F 9/45558* (2013.01); *Y02B 60/34* (2013.01)

(58) Field of Classification Search
CPC .............................. G06F 1/3203; G06F 9/5094
USPC .......................................................... 713/300
See application file for complete search history.

(56) References Cited

U.S. PATENT DOCUMENTS

| 7,149,843 | B1 | 12/2006 | Agesen et al. |
| 7,484,208 | B1 | 1/2009 | Nelson |
| 7,761,720 | B2 | 7/2010 | Kaushik et al. |
| 7,941,677 | B2 | 5/2011 | Penning |
| 8,074,084 | B2 * | 12/2011 | Karam et al. ................ 713/300 |
| 8,392,637 | B2 | 3/2013 | Diab et al. |
| 2002/0046355 | A1 * | 4/2002 | Takeuchi ...................... 713/320 |
| 2002/0157030 | A1 * | 10/2002 | Barker et al. ................ 713/320 |
| 2004/0003296 | A1 * | 1/2004 | Robert et al. ................ 713/300 |
| 2004/0255171 | A1 * | 12/2004 | Zimmer et al. .............. 713/300 |
| 2005/0060590 | A1 | 3/2005 | Bradley et al. |
| 2005/0251802 | A1 * | 11/2005 | Bozek et al. .................... 718/1 |
| 2005/0268078 | A1 * | 12/2005 | Zimmer et al. .................. 713/1 |
| 2007/0118772 | A1 | 5/2007 | Diab |
| 2007/0169121 | A1 * | 7/2007 | Hunt et al. ...................... 718/1 |
| 2008/0168283 | A1 * | 7/2008 | Penning ........................ 713/310 |

(Continued)

FOREIGN PATENT DOCUMENTS

| CN | 101640643 A | 2/2010 |
| EP | 2 184 890 A1 | 5/2010 |

OTHER PUBLICATIONS

A gigabit "subset PHY" Approach for 10GBase-T energy efficient, by Scott Powell, Nov. 11, 2007.*

(Continued)

*Primary Examiner* — Mohammed Rehman

(74) *Attorney, Agent, or Firm* — Sterne, Kessler, Goldstein & Fox P.L.L.C.

(57) ABSTRACT

A system for managing energy efficiency and control mechanisms in a network having a virtual machine includes a virtual machine power manager (VMPM) coupled to a virtual machine manager (VMM) and a network component. The VMPM is configured to receive power information from the network component, analyze the power information, generate configuration instructions based on the analyzing and send the configuration instructions to the VMM.

27 Claims, 7 Drawing Sheets

(56) References Cited

U.S. PATENT DOCUMENTS

| | | | |
|---|---|---|---|
| 2009/0077394 A1* | 3/2009 | Tsai et al. | 713/310 |
| 2009/0086650 A1* | 4/2009 | Moore et al. | 370/253 |
| 2009/0313486 A1* | 12/2009 | Tani | 713/300 |
| 2010/0192149 A1* | 7/2010 | Lathrop et al. | 718/1 |
| 2011/0307716 A1 | 12/2011 | Diab | |

OTHER PUBLICATIONS

Partial European Search Report for European Application No. 11004344.5 â 2416 dated Sep. 2, 2011, Two (2) pages.

C. Alippi et al., "*A Virtual Machine for Energy Management in WSNs*," Proceedings of the 2009 IEEE International Workshop on Robotic and Sensors Environments (Rose 2009) IEEE Piscataway, NJ, USA, 2009, pp. 173-177, XP000002658113, ISBN: 978-1-4144-4777-0.

R. Buyya, et al., "*Energy-Efficient Management of Data Center Resources for Cloud Computing: A Vision, Architectural Elements, and Open Challenges*," Jun. 2, 2010, XP000002658112, Retrieved from the Internet: url://arixiv.org/abs/1006.0308 [retrieved on Sep. 1, 2011].

Buyya, R. et al. "*Energy-Efficient Management of Data Center Resources for Cloud Computing: A Vision, Architectural Elements, and Open Challenges*," Proceedings of the 2010 International Conference on Parallel and Distributed Processing Techniques and Applications (PDPTA 2010, CSREA Press), Las Vegas, USA, Jul. 12-15, 2010, XP002658112.

Office Action, dated Sep. 7, 2012, for U.S. Appl. No. 12/813,085, filed Jun. 10, 2010, 10 pages.

Office Action for EP Application No. EP 11 004 344.5, European Patent Office, Munich, Germany, mailed on Nov. 7, 2012, 5 pages.

Amendment and Reply Under 37 C.F.R. § 1.111, filed Dec. 7, 2012, for U.S. Appl. No. 12/813,085, filed Jun. 10, 2012, 14 pages.

Non-Final Office Action, dated Jul. 26, 2012, for U.S. Appl. No. 12/813,085, filed Jun. 10, 2010, 6 pages.

Reply to Requirement for Election of Species, dated Aug. 27, 2012, for U.S. Appl. No. 12/813,085, filed Jun. 10, 2010, 2 pages.

Final Office Action, dated Mar. 25, 2013, for U.S. Appl. No. 12/813,085, filed Jun. 10, 2010, 12 pages.

Amendment and Reply Under 37 C.F.R. § 1.111, filed Jul. 25, 2013, for U.S. Appl. No. 12/813,085, filed Jun. 10, 2010, 16 pages.

Advisory Action, dated Aug. 5, 2013, for U.S. Appl. No. 12/813,085, filed Jun. 10, 2010, 3 pages.

Submission Under 37 C.F.R. § 1.114 and Preliminary Amendment and Reply Under 37 C.F.R. § 1.115, filed Sep. 25, 2013, for U.S. Appl. No. 12/813,085, filed Jun. 10, 2010, 16 pages.

Non-Final Office Action, dated Dec. 2, 2013, for U.S. Appl. No. 12/813,085, filed Jun. 10, 2010, 12 pages.

Amendment and Reply Under C.F.R. § 1.111, filed Mar. 4, 2014, for U.S. Appl. No. 12/813,085, filed Jun. 10, 2010, 14 pages.

Notice of Allowance, dated Apr. 14, 2014, for U.S. Appl. No. 12/813,085, filed Jun. 10, 2010, 7 pages.

Office Action, dated Jun. 8, 2013, for Chinese Patent Appl. No. 201110156082.5, 10 pages.

Office Action, dated Jan. 2, 2014, for Chinese Patent Appl. No. 201110156082.5, 9 pages.

Powell, Scott and Diab, Wael, "A Gigabit " Approach for 10GBASE-T Energy Efficient Ethernet, *Broadcom,* Atlanta Georgia (Nov. 2007); 6 pages.

Taiwanese Office Action directed toward related Taiwanese Application No. 100120146, mailed Nov. 12, 2014 from the Taiwan Patent Office; 7 pages.

\* cited by examiner

POWER MANAGER FOR A NETWORK HAVING A VIRTUAL MACHINE

CROSS REFERENCE TO RELATED APPLICATIONS

The present application is related to U.S. Non-Provisional patent application Ser. No. 12/813,085, filed concurrently herewith, which is entitled "Global Control Policy Manager," and is incorporated herein by reference in its entirety.

FIELD OF THE INVENTION

The present invention generally relates to managing power consumption a network that uses virtual machines.

BACKGROUND OF THE INVENTION

Energy costs continue to escalate in a trend that has accelerated in recent years. Because of this, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network components, etc.).

Modern networking components are increasingly implementing energy consumption and efficiency (ECE) control mechanisms. Some ECE control mechanisms allow physical layer components to enter and exit a low power state. An ECE control policy controls when and under what circumstances, ECE control enabled physical layer components enter and exit low power states. The integration of the control policy decision engine with the controls to the physical layer will affect the overall efficiency attained. The control policy plays a key role in maximizing savings while minimizing performance impact on the network.

The same modern networks that are increasingly using ECE-enabled components also are increasingly using virtualized components. Virtualized environments, managed by virtual machine managers (VMMs) are deployed in different ways, on top of different physical topologies. With ECE in a traditional, non-virtualized network implementation, physical network components, e.g., ports, bridges and network switches, have a more direct connection to the logic that implements the ECE policies. Within virtualized environments however, the underlying physical topology upon which the VM is deployed and the ECE policies attached thereto are not generally visible to the virtual machine manager (VMM).

Challenges to implementing ECE control policies in virtualized network include the dynamic nature of the VM and different types of topologies upon which a VM can be deployed, e.g., VMs that span multiple machines, complex and dynamically changing network topologies, and the maintenance of performance standards.

Thus, what is needed is a virtual machine power manager (VMPM) with power and topology information that overcomes the shortcomings described above.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

The invention is described with reference to the accompanying drawings. The drawing in which an element first appears is typically indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

Overview

Figure 1:
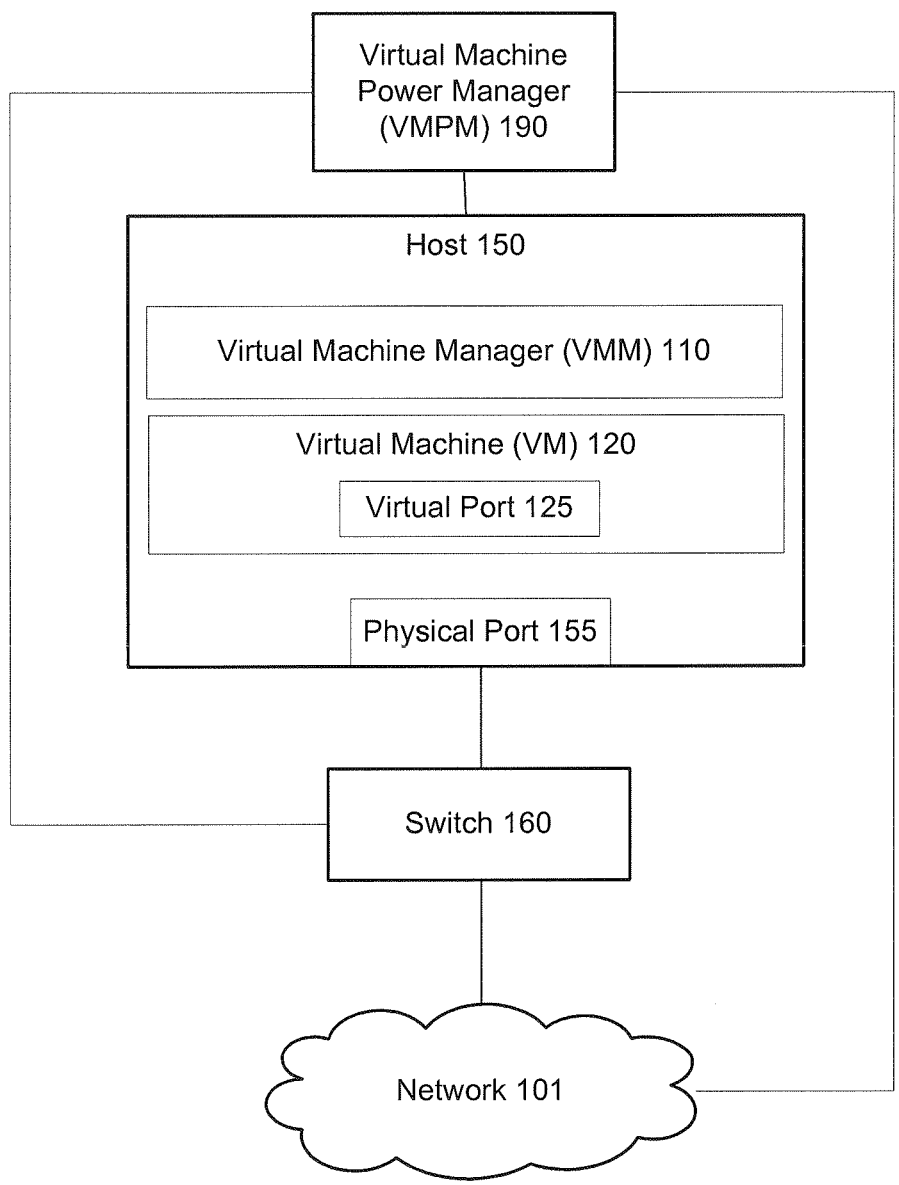
FIG. 1 is a block diagram of a system for managing power consumption in a network that uses a virtual machine, according to an embodiment of the present invention.

FIG. 1 is a block diagram of an embodiment of a system 100 for managing energy conservation and efficiency (ECE) and control mechanisms in a network having a virtual machine. Host 150 is depicted coupled to network switch (switch) 160 and virtual machine power manager (VMPM) 190. Host 150 includes virtual machine manager 110, physical port 155 and virtual machine (VM) 120, such VM 120 having virtual port 125. Switch 160 is shown coupled to network 101.

Host 150 is typically a computer with various computer system configurations, including multi-core multiprocessor systems, minicomputers, mainframe computers, computer linked or clustered with distributed functions, as well as pervasive or miniature computers that may be embedded into virtually any device.

As used herein network 101 can be any one or more networks of any type including, but not limited to, local area networks, medium area networks, or wide-area networks, such as, the Internet. In an embodiment, system 100 is a subset of a larger, interconnected data center having multiple hosts 150 and switches 160 connected by network 101.

Network switch 160 is typically a networking bridge device with data ports that can additionally have routing/switching capability, e.g., L3 switch/router. The switch could have as little as two data ports or as many as 400 or more data ports, and can direct traffic in full duplex from any port to any other port, effectively making any port act as an input and any port as an output. Herein, data ports and their corresponding links can be interchangeably referred to as data channels, communication links, data links, etc, for ease of discussion. Because the physical depictions in the figures should not be interpreted as limiting, switch 160 and host 150, as used herein can include host 150 and switch 160 combined in a single physical device (not shown). Switch 160 also broadly includes the use of switch logic in modern tiered switching architectures.

VM 120 is typically an instance of a virtual machine as a part of a virtualization platform. One having skill in the art will know of modern virtualization platforms and their implementation. A system having a virtual machine typically provides a complete system platform, which supports the execution of a complete operating system (OS). Virtual machines are typically managed by virtual machine managers (also known as hypervisors), such as VMM 110.

Energy Consumption and Efficiency (ECE)

As used herein energy consumption and efficiency (ECE) control mechanisms are used to refer to various modern techniques for controlling the energy consumption and efficiency of devices. Generally speaking, these ECE mechanisms are designed to reduce energy consumption and improve efficiency while maintaining an acceptable level of performance.

One example of an ECE control mechanism is the IEEE P802.3az standard, also known as Energy Efficient Ethernet, which is incorporated herein by reference. EEE is an IEEE suggested standard that is designed to save energy in Ethernet networks on a select group of physical layer devices (PHYs). Example PHYs referred to within the EEE standard include the 100BASE-TX and 1000BASE-T PHYs, as well as emerging 10GBASE-T technology and backplane interfaces, such as 10GBASE-KR.

Adding an additional layer of control, EEE capable devices can have their ECE features managed by a type of configuration instructions called a control policy. Control policy generation can consider different types of power information, e.g., traffic patterns over time, traffic, performance characteristics, the type and profile of traffic and other relevant information to help decide when to utilize EEE features. Control policy generation may also be determined by looking at hardware subsystem activity as a proxy for actual traffic analysis. Broadly speaking, power information can include all configuration, resource and power usage information for all network hardware, software and traffic that is relevant for ECE optimization.

Virtual Machine Power Manager (VMPM)

Returning to virtual machines, one having skill in the relevant art will appreciate that in some implementations, the virtual control plane (e.g., VMM 110) of a virtualized system can be unaware of different aspects of the physical portions of the system. This lack of information in VMM 110 is especially important with respect to ECE improvement, e.g., VMM 110 does not have information about different ECE capabilities, control policies and other power conservation features of different system components. As discussed herein, by collecting power information, analyzing the power information, generating configuration instructions and interacting with VMM 110, an embodiment VMPM 190 is designed to address many of these problems. Termed another way, in an embodiment, it is a feature of VMPM 190 to relay the ECE logic of associated system components to VMM 110 in order to improve ECE.

VMPM 190 is coupled to a VMM 110 and network components, e.g., switch 160, and receives power information from at the network components. This power information will be discussed further below. After collecting power information, VMPM 190 analyzes the power information and generates configuration instructions based on the analysis. These configuration instructions, discussed further below, are then relayed to VMM 110.

The analysis and generation features described above can balance the power information against other network considerations, e.g., performance, security, etc. In an embodiment, VMPM 190 improvement of ECE performance can be balanced, coordinated with and otherwise affected by, other performance characteristics and goals set for the system.

Any characteristics available to VMPM 190 or similar components, can be analyzed and relayed to VMM 110 or similar virtual machine management components. In an embodiment, the VMPM is designed to be a unifying resource to promote ECE with respect to VMM 110 managed systems. In an embodiment, VMPM 190 acts to coordinate requirements of different system components, e.g., performance, with different ECE goals.

In generating configuration instructions, VMPM 190 can receive various types of energy/power-relevant information (power information) about network components. Examples of this power information include physical layer (PHY) information, link information, ECE control policy information and application information. One having skill in the relevant arts, with access to the teachings herein, will appreciate that a broad range of information, characteristics, policies, etc., will qualify as power information as used herein.

Physical layer (PHY) information can relate to the operational characteristics or capabilities of a network component itself, including characteristics such as the supported link rates available to the network component, the different modes of operation (e.g., subset modes) available to the component, etc.

Link information can relate to the utilization of the links between network components. An example of link information is traffic buffer fullness. In another example, the link information can include burstiness parameters (e.g., size of the bursts on the link, time between bursts, idle time on the link, etc.) that enable a determination of the actual link utilization. Another example is the percentage of link capacity usage over time, e.g., if the average usage of 10G link is always less than 1G over a period of time this can be a useful measure of link utilization.

ECE policy parameters can relate to those parameters that can govern the analysis and/or operation of the control policy set for the network component. When a network component is configured, for example, policy parameters can be set to govern the ECE operation of the device, including link utilization thresholds, IT policies, user parameters, etc. Finally, application information can relate to the characteristics of the system applications that can govern the operation of network components. An example of useful application information includes the streams running through an analyzed network component, e.g., in a L2 switch without virtualization, awareness of an AVB stream running through the component can be useful in helping determine whether lower power states are useful.

As should be appreciated, the specific set of power information received, the analysis performed on the power information and the process of generating configuration instructions based on the power information would be implementation dependent. Regardless of the data collected and the analysis mechanisms used, it is significant that VMPM 190 is consolidating, analyzing and utilizing power information from network components to guide the operation of VMM 110, and possibly over all network configuration and routing/switching.

It should be noted that the principles of the present invention can be broadly applied to various contexts, such as in all PHYs that implement ECE (e.g., backplane, twisted pair, optical, etc.). Moreover, the principles of the present invention can be applied to standard or non-standard (e.g., 2.5G, 5G, 100M, 1G and 10G optical interfaces, PON, etc.) link rates, as well as future link rates (e.g., 40G, 100G, 400G, Terabit etc.). It should also be noted that the principles of the present invention can be applied to a given link either asymmetrically or symmetrically.

Example ECE Mechanisms

A method of power savings (ECE) implemented within the EEE standard is a technique known as sub-rating. In general, a reduction in link rate to a sub-rate of the main rate enables a reduction in power, thereby leading to energy savings. In one example, this sub-rate can be a zero rate, which produces maximum power savings. In addition, the principles of the present invention can be applied to variations of sub-rating, such as "subset-PHY" and other similar techniques.

One example of sub-rating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1G PHY can be created from a parent 10GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of sub-rating as method of power savings (ECE) implemented within the EEE standard is a technique known as Low Power Idle (LPI), e.g., the sub-rate is set to zero while the connection is idle. Traditional Ethernet standards specification has an active idle state, which requires the bulk of traditional Ethernet circuitry to remain powered up, independent of data transmission. This constant powered-up state results in similar power consumption regardless of whether or not a link is being used. LPI provides for a lower consumption energy state that can be employed during the periods of low link utilization (high idle time) common to many Ethernet networks. LPI also allows for rapid transitions back to the active state for high-performance data transmission.

In general, LPI relies on turning the active channel silent when there is nothing to transmit. Energy is thereby saved when the link is off. Refresh signals can be sent periodically to enable wakeup from the sleep mode. In one enhancement to a standard LPI embodiment, a sync signal can be used on the interfaces (i.e., medium dependent interface (MDI) and PHY/medium access control (MAC) interface) to allow for a quick wake-up from the sleep mode and maintain frequency lock. For example, on the MDI interface for a 10GBASE-T signal, a simple PAM2 pseudorandom bit sequence could be used on pair A during LPI mode. This would not significantly increase the power that is consumed.

In general, both the subset and LPI sub-rating techniques discussed above involve turning off or otherwise modifying portions of the PHY during a period of low link utilization. Due to the similarity in the complexity of their implementation, the overhead is relatively small and both sub-rating techniques can be incorporated practically in the same PHY. This gives increased flexibility to the application and application requirements in the upper layers. In general, both techniques present different solutions and challenges to the different applications and traffic patterns from a networking perspective (above the PHY).

An example of a method and system of sub-rating a network connection to achieve a reduction in power usage can be found in U.S. patent application Ser. No. 12/369,026, which is entitled "Hybrid Technique in Energy Efficient Ethernet Physical Layer Devices," and is incorporated herein by reference in its entirety.

LPI is favorable when there is very low link utilization. Moderate utilization, on the other hand, may have widely varied link utilization. Obtaining efficient outcomes in a network with such varied traffic requires coordination between different network components. Unsuccessful coordination can add cost, latency, and jitter to network traffic and makes the energy efficiency less predictable.

The foregoing features associated with the LPI technique should be considered in the context of a network having a VMPM 190 and VM 110. As noted above, traditionally, VMMs do not receive power information about network components in the system. This lack of information can render ECE techniques such as LPI unworkable in conventional configurations.

In an example of an LPI implementation using the components shown in FIG. 1, under a traditional approach, although physical port 155 may receive notification of the switch 160 change in status, virtual port 125 and virtual machine 120 may not have the same notice. Complex ECE policies implemented at components connected to VM 120 are generally not propagated to associated VMM 110 in traditional configurations. In an embodiment, VMPM 190 can receive and analyze this power information, including the control policies and capabilities of connected components.

In another embodiment, if idle-promoting approaches are used by components (e.g., buffering and queues used by switch 160 and physical port 155), VMPM 190 can monitor these approaches and relay status and other information to VMM 110.

In an embodiment, different network components may have different ECE capabilities. For example, some components may have no ECE capabilities, while others may only have basic idle capacity, e.g., idle on or idle off. Other more sophisticated components can have internal control policies that guide ECE functions, while other components are controlled by control policies on external devices. As would be appreciated by one having skill in the art given the description herein, VMPM 190 can interact with all of these different devices, coordinating their characteristics, events, policies and other related information, with associated VMMs 110 in the system. In addition to a basic storage and coordination of connected device characteristics, in an embodiment, VMPM 190 can perform a synchronization role between devices to promote ECE.

In an embodiment, by knowing the particular ECE policies and EEE capabilities of different network components, VMPM 190 can avoid the components with ECE policies which otherwise may degrade required performance. For example, if VMPM 190 is managing an instance of VM 120 that handles banking information requiring low latency, certain components with aggressive ECE control policies could be avoided. Similarly, VMPM 190 can direct other non-performance sensitive applications in other managed VMs to network components with additional EEE capabilities and different ECE control policies.

In embodiment, this connection between VMPM 190 and network components, e.g., switch 160, is constant and dynamic, thereby giving VMPM 190 the capability of quickly updating VMM 110 about changing policies and circumstances. An example action that can be performed by VMM 110 in response to information from VMPM 190 is related to virtual port 125. In an example, virtual port 125 can be set to coordinate its responses, e.g., buffering of specific types of traffic, with physical port 155 and switch 160.

In another embodiment, VMPM 190 can receive power information from network components and relay this information to VMM 110 without performing analysis of the power information. In this embodiment, VMPM 190 acts to aggregate the power information, and VMM 110 performs the analysis and ECE determinations.

Placement of VMPM

Figure 2:
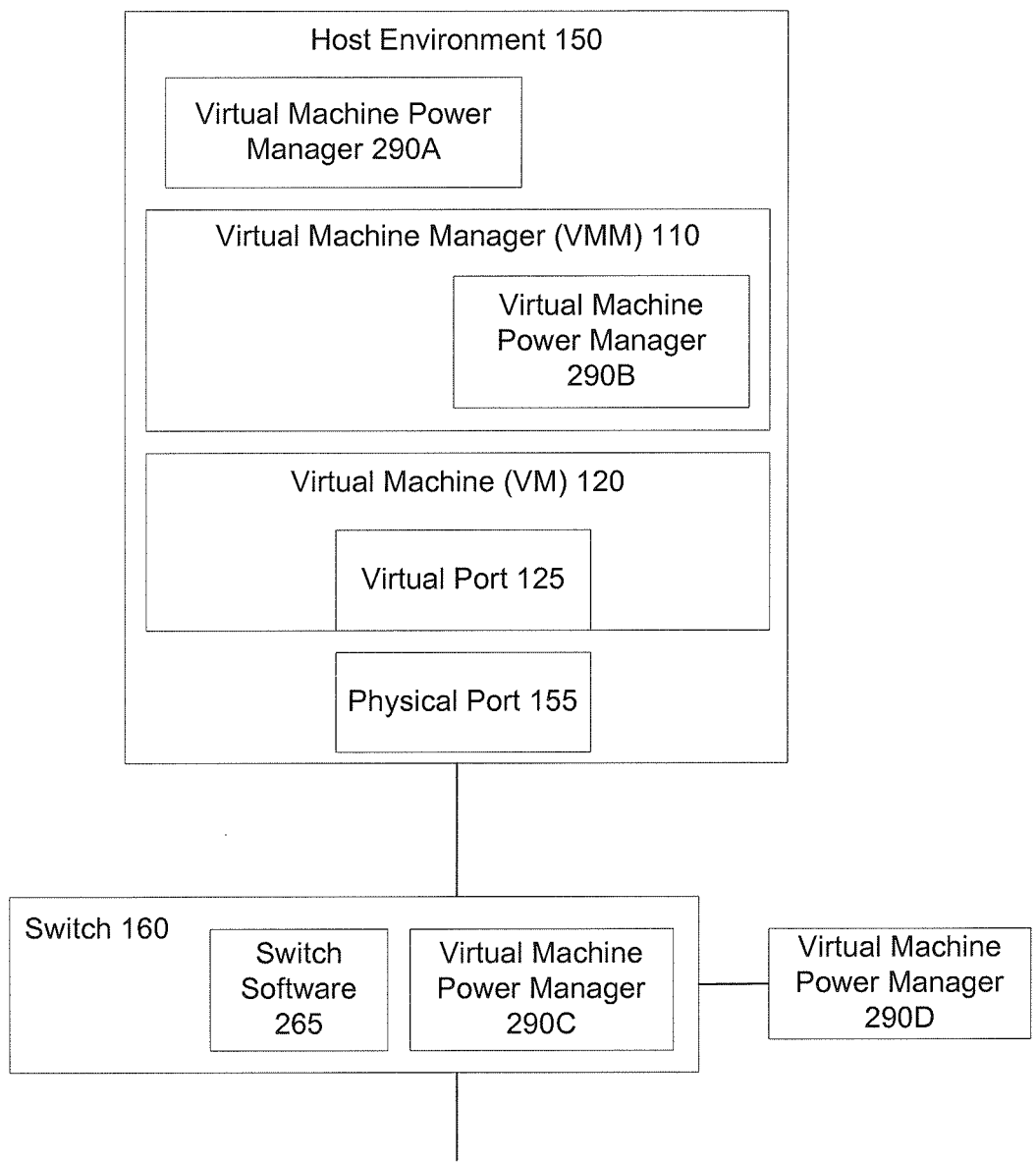
FIG. 2 is a block diagram of a system for managing power consumption in a network that uses a virtual machine, the figure detailing alternate embodiments of a virtual machine power manager, according to an embodiment of the present invention.

FIG. 2 illustrates alternative physical and logical configurations for different embodiments of VMPM 190 from FIG. 1. Each depicted placement of VMPM 290A-D is intended to be non-limiting, and present a placement that can function independently or in coordination with other VMPM 290A-D components. For example, system 200 could have a single VMPM 290A, two VMPMs 290A-B, or all four VMPM 290A-D components.

VMPM 290A is depicted on FIG. 2 placed as a component of host 150. Instead of the external placement illustrated on FIG. 1, VMPM 290A is a component on host 150. As described above, in an embodiment, VMPM 190, 290A can connect with different network devices, e.g., switch 160 and components on network 101. In an embodiment, the installation on host 150 does not affect this connectivity, VMPM 290A having the capacity to connect to external components via physical port 155.

VMPM 290B is depicted on FIG. 2 placed as a component of VMM 110, e.g., a software component or "plug-in." As would be appreciated by one skilled in the relevant arts, software systems, e.g., VMM 110, can allow add-on software components to be installed and interact with the main system. In an embodiment, VMPM 290B is designed to be installed as a plug-in in a VMM 110 software system. Other software interactions are also possible.

VMPM 290C is depicted on FIG. 2 placed as a component of switch 160, e.g., a separate, software component linked to the existing switch software 265 or "plug-in" component (not shown) to switch software 265. As would be appreciated by one having skill in the art, switch 160 can have installed software and hardware logic that provide different functions to the switch device. In an embodiment, VMPM 290C is installed as hardware logic in switch 160 and can manage one or more VMMs, including VMM 110. In another embodiment, VMPM 290C is installed as a software component in switch 160. In another embodiment, VMPM 290D is depicted as an external component linked to switch 160, this linkage contrasting with the embodiment illustrated on FIG. 1 where VMPM 190 was linked directly to host 150.

The placement illustrations of FIG. 2 are not intended to be limiting. One having skill in the relevant art will appreciate that the functions of VMPM 190, 290 as described herein can be located in various positions within the systems described herein, implemented as either software or hardware, or a combination of the two.

Multiple Virtual Machines

Figure 3:
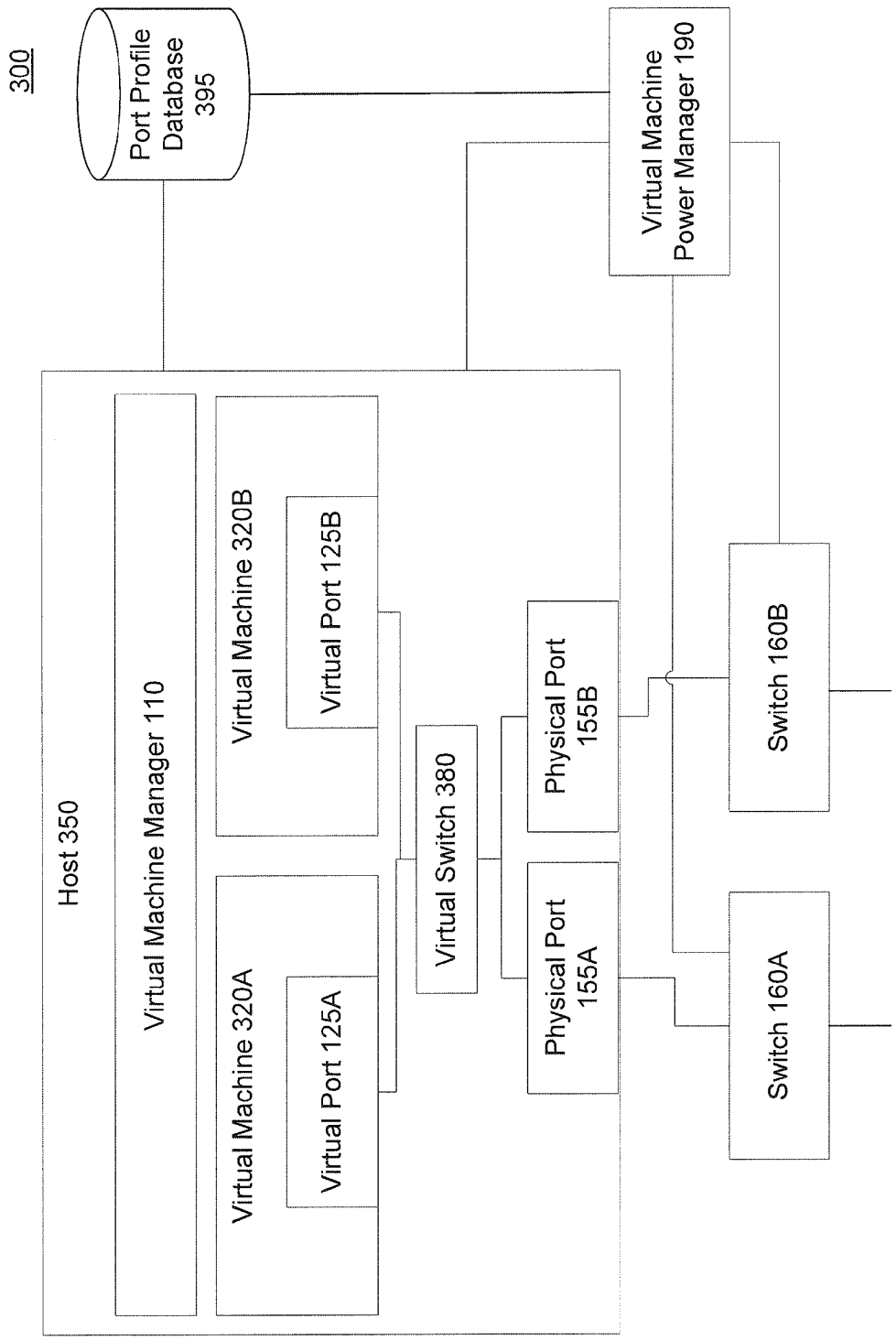
FIG. 3 is a block diagram of a system for managing power consumption in a network that uses multiple virtual machines, according to an embodiment of the present invention.

FIG. 3 illustrates host 350 as including virtual machines 320A-B, managed by VMM 110, and virtual switch 380 connected to virtual ports 125A-B and physical ports 155A-B. FIG. 3 also illustrates an embodiment of VMPM 190 connected to host 350 and switches 160A-B.

As would be appreciated by one having skill in the art, the complexities of multiple VM 320A-B management by VMM 110 greatly complicates traditional ECE improvement in system 300. In addition, virtual switch 380 connected to physical ports 155A-B provides an additional area where performance can by improved by embodiments above traditional approaches.

In an embodiment, VMPM 190 can provide information and direction to VMM 110 that can affect where VMM 110 places different VM 320A-B functions. As would be appreciated by one having skill in the relevant arts, VM function placement, e.g., live migration, can be used to allocate operating VM applications to different machines based on VMM 190 direction. In an example ECE application, VM 320A may have an ECE advantage with respect to its interaction with host 350, virtual switch 380 and physical port 155A. In an embodiment, VMPM 190 can have information regarding the different ECE characteristics of all FIG. 3 components, and guide VMM 110 in the placement of virtualized applications. For example, VMPM 190 can direct the placement of communication-intensive applications on VM 320A instead of VM 320B because of the ECE advantage characteristics of 320A.

In a variation of this example, VMPM 190 could balance the performance implications of application placement, e.g., placement of the communication-intensive application on VM 320A, and determine the application should be placed elsewhere. It should be appreciated that, in an embodiment, VMPM 190 balances competing determinations using collected ECE information and other considerations to guide VMM 110.

In an embodiment, system 300 may have policies implemented that are designed to promote different, possibly contradictory goals than ECE. For example, while ECE considerations may cause VMPM 190 to direct VMM 110 or switch 160B to buffer traffic for idle-time considerations, switch 160B may have load-balancing logic implemented that contradicts these buffering instructions. In an embodiment VMPM 190 has information regarding different system policies, e.g., load-balancing, ECE, security and performance, and acts as a centralized coordination component to guide VMM 110 and related system components.

In an embodiment, VMPM 190 generates configuration instructions to manage the routing/switching by VMM 110, of data traffic from virtual ports 125A-B. If, for example physical port 155A has, at a particular moment, superior power characteristics to physical port 155B, VMPM 190 can direct VMM 110 to prefer this port if other considerations, e.g., performance requirements, permit. In traditional VMM 110 implementations, the coordination of an improved ECE with multiple VMs 320A-B on a single host, as illustrated on FIG. 3, has been difficult because of the lack of comprehensive ECE information.

In an embodiment, as noted above, VMPM 190 has a dynamic coordinating capability vis-à-vis connected system components. As illustrated on FIG. 3, the coordination of ECE characteristics and capabilities between and among the different components, e.g., switches 160A-B, physical ports 155A-B, virtual switch 380, VMs 320A-B and host 150 can be performed by VMPM 190.

In an additional example, still referring to FIG. 3, if switch 160A has ECE enabled and switch 160B does not, VMPM 190 can prefer the 160A traffic route if other considerations, e.g., performance requirements, permit. In a traditional virtualized system, VMM 110 does not have information corresponding to the ECE characteristics of downstream systems. This example embodiment that places VMPM 190 as coupled to switches 160A-B and VMM 110 increases the cooperation between ECE systems.

In further embodiments illustrated on FIG. 3, VMPM 190 can route traffic to improve ECE using in a variety of approaches:

A1. Switch 160 can route traffic from virtual ports 125A-B to physical ports 155A-B.

A2. VMM 110 can be directed to prioritize the processing of output from VM 320A or 320B.

A3. VMM 110 can be directed to perform migration of VM functions from VM 320A to 320B based on ECE requirements.

A4. If physical port 155A has ECE enabled, host 350 can be directed to direct data to this port.

The list of Approaches A1-A4 noted above in not intended to be limiting. One having skill in the relevant arts, given the descriptions herein will understand that VMPM 190 can route traffic in additional ways to affect ECE in system 300.

Port Profile Database (PPD)

Still referring to FIG. 3, in an embodiment, one resource that can be used by VMPM 190 to both receive and store ECE and general component characteristics is port profile database (PPD) 395. As would be appreciated by one having skill in the art with knowledge of the descriptions herein, PPD 395 is used by other system components, including VMM 110, to provide information about the characteristics of system components, e.g., ports.

In an embodiment, VMPM 190 can interact with VMM 110 to collect, analyze and relay different configuration instructions to VMM 110 and to ECE enabled devices. As would be appreciated by one having skill in the relevant art(s) given the description herein, configuration instructions can broadly include any instructions that when relayed to VMM 110 can impact ECE optimization. For example, configuration instructions broadly include, EEE control policies, Energy efficient Ethernet Networking (EEN) policies, and other ECE instructions to VM managed hardware, software and traffic.

Virtualized system optimization can benefit from a two way routing/switching of information by embodiments to VMM 110 from VMPM 190 and from VMM 110 to VMPM 190. As noted above, because both VMPM 190 and VMM 110 can share access to PPD 395, both components can share information via this central repository. For example, VMPM 190 can gather power characteristics and/or control policy information about network components, and store them in PPD 395 for analysis by VMM 110 to support routing/switching decisions. Alternatively, VMPM 190 can provide direct or contingent routing/switching instructions directly to network components to enact routing/switching decisions.

Virtual Machine Spanning

Figure 4:
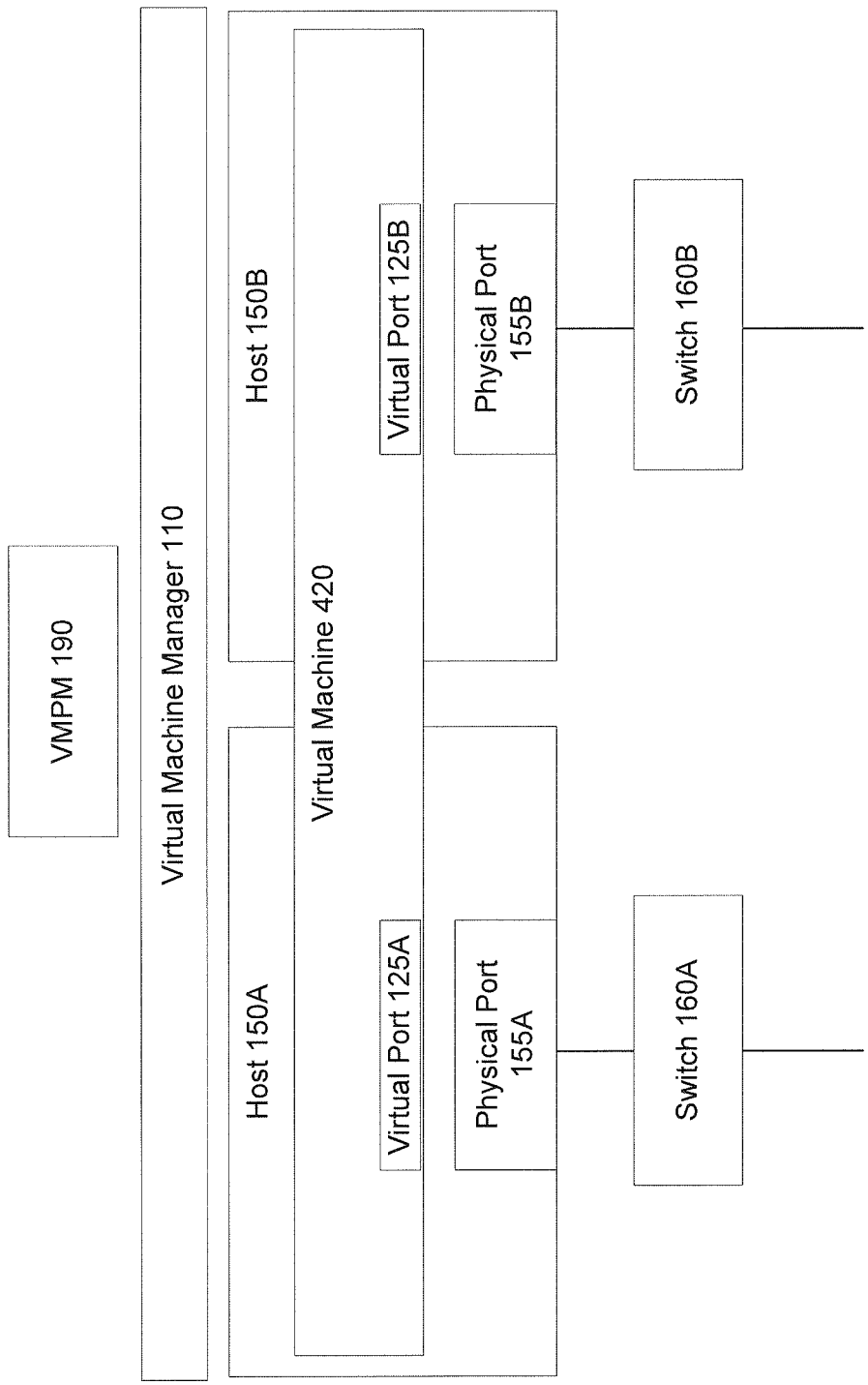
FIG. 4 is a block diagram of a system for managing power consumption in a network that uses a spanning virtual machine, according to an embodiment of the present invention.

FIG. 4 illustrates an embodiment of system 400 having a virtual machine 420 that spans multiple physical hosts 150A-B, VMM 110 and VMPM 190. As with the illustration in FIG. 3 (multiple VMs in a single host), the embodiment illustrated in FIG. 4 represents increasing complexity in term of VMM 110 ECE management.

VM 420 and its placement across multiple physical devices (hosts 150A-B) shows a varied ECE environment. For example, virtual port 125A and 125B now can map to physical port 155A and 155B respectively, such ports potentially having different ECE characteristics. It should be noted also that, in the embodiment illustrated in FIG. 4, each host 150A-B are depicted as physically connected to different switches 160A and 160B respectively. As noted above VMPM 190, in an embodiment, can coordinate the ECE capabilities and control polices between and among these complex connections.

In an embodiment illustrated on FIG. 4, direction by VMPM 190 to VMM 110 can be especially useful because of the different host 150A-B spanning by VM 420, as described above. In an embodiment, VMPM 190, having access to ECE information for FIG. 4 components, can direct VMM 110 to allocate virtualized applications between hosts 150A-B.

Configuration Instructions: Traffic Routing/Switching

Figure 5:
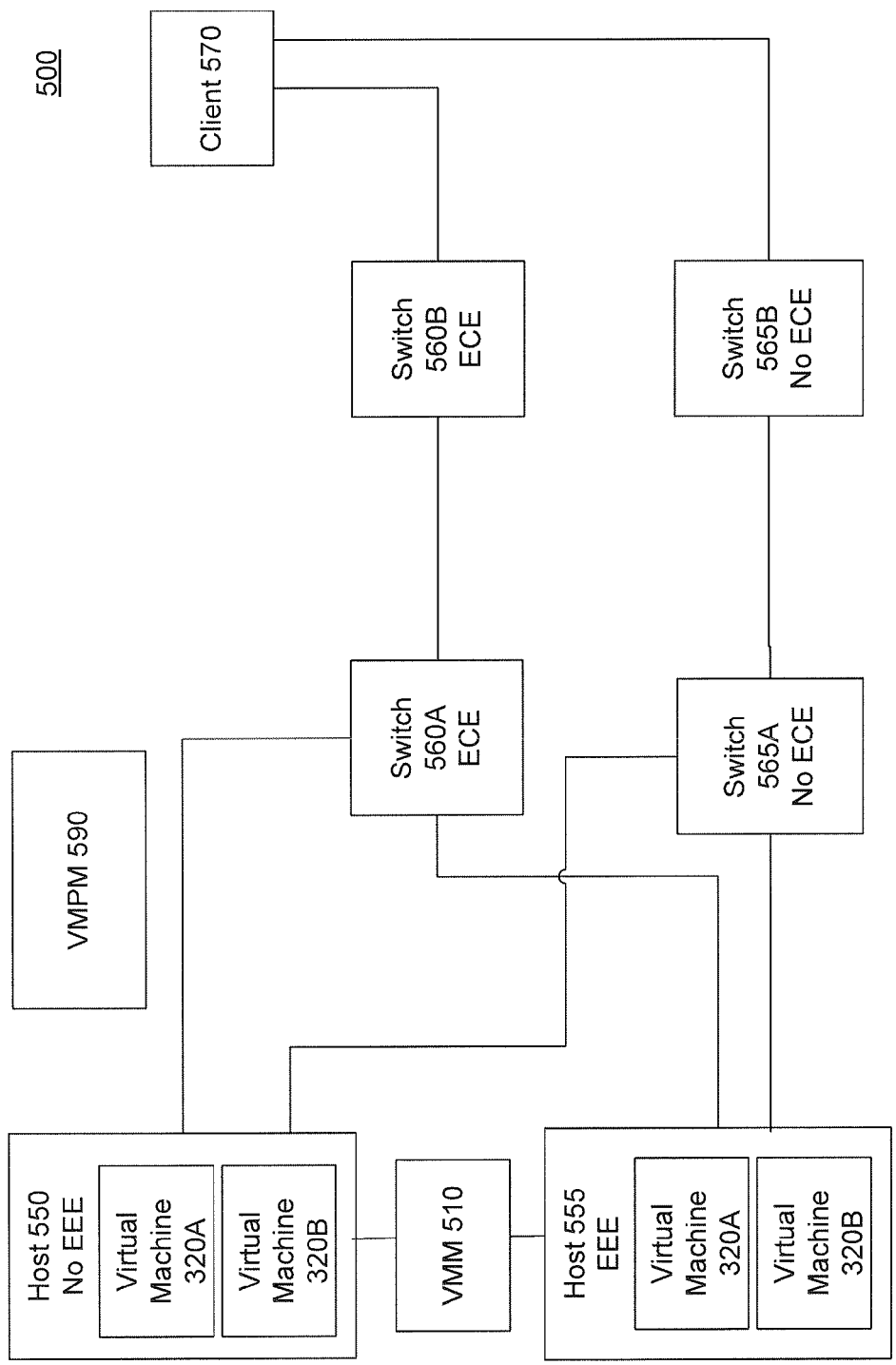
FIG. 5 illustrates a data center implementation, according to an embodiment of the present invention.

FIG. 5 illustrates a non-limiting example of data center 500, where VMPM 590 manages power consumption in a network having a network topology including two hosts (550, 555), four switches (560A-B, 565A-B) and client 570. Because the teachings herein as applied to traffic path selection can be generally applied to all components that handle these functions, as used herein, the terms routing, switching and routing/switching are generally used interchangeably.

In an example embodiment illustrated on FIG. 5, switches 560A-B have ECE capabilities (e.g., EEE LPI as discussed above) and switches 565A-B do not. In this embodiment, VMPM 590 has collected the ECE characteristics of all hardware components shown on FIG. 5. As would be appreciated by one having skill in the relevant art(s), VMM 510 can direct traffic through various network traffic paths, e.g., host 550 to switch 560A to switch 560B to client 570. One having skill in the art will appreciate that this routing/switching can be accomplished in a variety of ways, including the tagging of data packets and the routing/switching by the switches according to the tags.

VMPM 590, having information available corresponding to ECE information (switch 560A-B capabilities) can analyze this information and combine it with other considerations, e.g., performance requirements. In this example, because the ECE capabilities of switches 560A-B, VMPM 590 directs VMM 510 to use this route for traffic to client 570. This routing/switching can be performed by VMM 510 using the packet tagging approach described above. As would be appreciated by persons having skill in the relevant art(s), other traffic paths can be considered.

Figure 6:
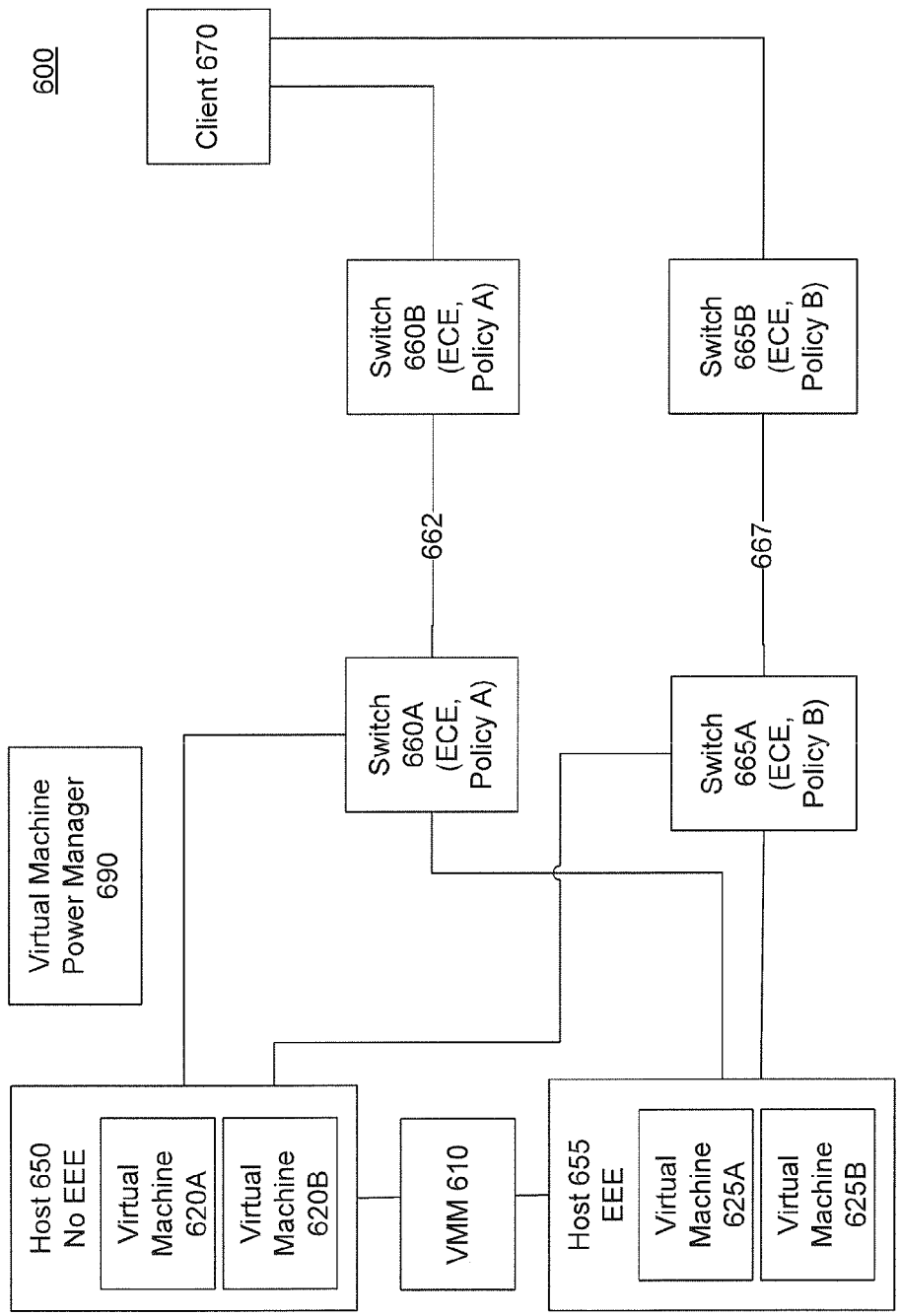
FIG. 6 illustrates an additional data center implementation, according to an embodiment of the present invention.

FIG. 6 illustrates a non-limiting example of data center 600, where VMPM 690 manages power consumption in a network having a network topology including two hosts (650, 655), four switches (660A-B, 665A-B) and client 670. In an example illustrated by FIG. 6, switches 660A-B have ECE capabilities and a control policy "A" implemented, and switches 665A-B have ECE capabilities and a control policy "B" implemented. In this example, control policy "A" has traffic-specific ECE policies (e.g., prioritizing VoIP traffic), and policy "B" does not implement traffic-specific ECE policies.

In an embodiment, VMPM 690 can be "traffic-aware" in its coordination of ECE policies and capabilities. One challenge of VMM 610 is the interaction with types of network traffic on the virtual and physical network component devices. For example, switches 660A-B, 665A-B can be set to carry both high priority (e.g., video streaming, VoIP) traffic and low-priority (e.g., HTML) traffic. Those skilled in the relevant art(s) will understand that different ECE policies/approaches can be designed around different traffic types. For example, switches 660A-B, according to policy "A" noted above, can be set to buffer low-priority standard traffic and immediately relay VoIP high-priority traffic. In an embodiment, VMPM 690 is coupled to the FIG. 6 switches 660A-B, 665A-B and can receive specific power information regarding ECE control policies and other information.

In another embodiment, VMPM 690 can also be performance-aware—weighing the performance implications of routing/switching determinations. For example, the four switches noted above (660A-B, 665A-) can have settings determined that increase the speed of all traffic notwithstanding ECE considerations, if performance considerations dictate.

Continuing with this example, VMPM 690 can analyze the received power information and generate configuration instructions for VMM 610 regarding data center 600 traffic types. Thus, in this example, if a traffic profile required by a specific virtualized application favors a particular type of traffic, VMPM 690 can not only direct VMM 610 to direct traffic to the link path with a control policy that improves ECE, but also direct VMM 610 to reallocate the virtualized application placement between the VMs 620A-B and 625A-B.

In another example embodiment illustrated on FIG. 6, connection 662 is a 10GB link and connection 667 is a 1GB link. As would be known by one skilled in the art, a 10GB link will use more power than a 1GB link, and ECE policies implemented, in this example, on switches 660A-B and 665A-B can take these link speeds and power requirements into account. In an embodiment of VMPM 690, these link speeds and ECE policies can be coordinated with virtualized application placement on VMs 620A-B and 625A-B. In an embodiment, VMPM 690 can generate configuration instructions for VMM 610 to implement the routing/switching techniques noted above (packet tagging, for example).

In addition, if the traffic from particular virtualized application favors the performance balance between the faster 662 link and the slower 667 link, VMPM 690 can not only direct VMM 610 to direct traffic to link path 662, but also direct to VMM 610 to reallocate the virtualized application placement between the VMs 620A-B and 625A-B. Without an embodiment that includes the VMPM 690 analysis and management characteristics described above, mismatches and inefficient configurations of network components can occur.

This routing/switching and resource allocation guidance would not traditionally be available to VMM 610, and the generation of configuration instructions by VMPM 690, can act to promote ECE in data center 600.

Method 700

Figure 7:
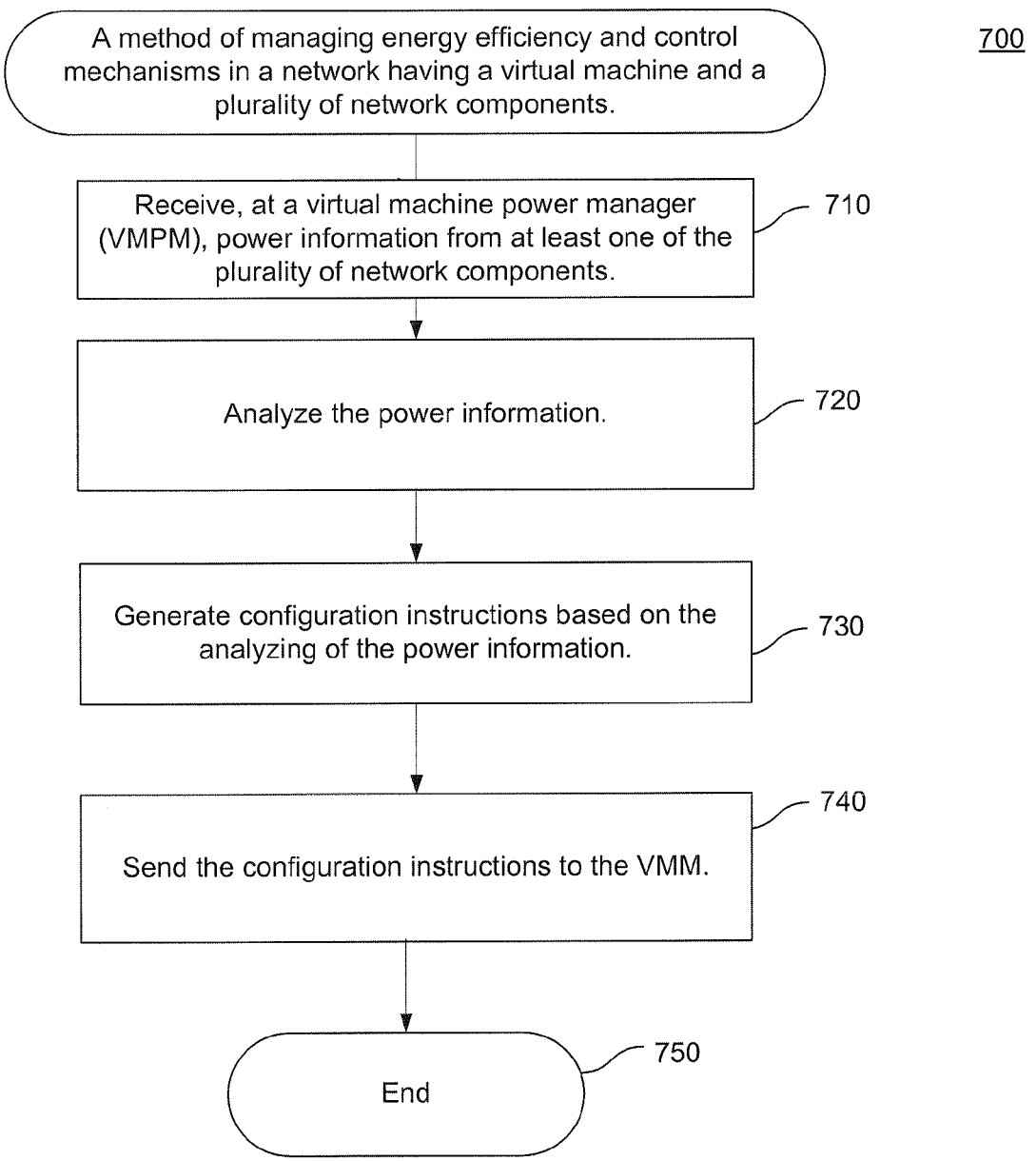
FIG. 7 shows a flowchart illustrating a method for managing energy efficiency and control mechanisms in a network having a virtual machine according to an embodiment of the invention.

This section and FIG. 7 summarize the techniques described herein by presenting a flowchart of an exemplary method 700 of managing energy efficiency and control mechanisms in a network having a virtual machine and a plurality of network components. While method 700 is described with respect to an embodiment of the present invention, method 700 is not meant to be limiting and may be used in other applications.

As shown in FIG. 7, an embodiment of method 700 begins at step 710 where a virtual machine power manager (VMPM) receives power information from at least one of the plurality of network components. In an embodiment, VMPM 190 receives power information, such as ECE information discussed above, from switch 160. Once step 710 is complete, method 700 proceeds to step 720.

At step 720, the power information is analyzed. In an embodiment, the power information, such as the ECE information from switch 160 is analyzed by a VMPM 190. Once step 720 is complete, method 700 proceeds to step 730.

At step 730, configuration instructions are generated based on the analyzing of the power information. In an embodiment, VMPM 190 generates configuration instructions based on the analysis of the power information received from switch 160. Once step 730 is complete, method 700 proceeds to step 740.

At step 740, the power information is sent to the virtual machine manager. In an embodiment, VMPM 190 sends the configuration instructions to VMM 110. Once step 740 is complete, method 700 ends at step 750.

Conclusion

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. An apparatus for managing energy efficiency and control mechanisms in a network having a virtual machine shared by a plurality of network components, the apparatus comprising:
   a virtual machine power manager (VMPM) coupled to a virtual machine manager (VMM), and to the plurality of network components, wherein the VMPM is configured to:
   receive respective power information from the plurality of network components;
   analyze the respective power information;
   generate a configuration instruction based on the analyzing of the respective power information;
   send the configuration instruction to the VMM to configure the virtual machine to function in accordance with the analyzed respective, power information; and
   update the configuration instruction in response to a change in the respective power information for at least one of the plurality of network components.

2. The apparatus of claim 1, wherein the VMPM is further configured to:
   receive configuration information from the VMM; and
   send the configuration information to the plurality of network components.

3. The apparatus of claim 1, wherein the VMPM is configured to receive power information from a port profile database.

4. The apparatus of claim 1, wherein the configuration instruction comprises routing information or switching information for traffic on the network.

5. The apparatus of claim wherein the configuration instruction comprises a control policy for controlling energy efficiency and control mechanisms.

6. The apparatus of claim 5 wherein the energy efficiency and control mechanisms include Energy Efficient Ethernet (EEE) control policies.

7. The apparatus of claim 1, wherein the VMPM is further configured to:
   send analyzed respective power information to the plurality of network components, and
   coordinate the configuration instruction sent to the VMM with the analyzed respective power information sent to the plurality of network components.

8. The apparatus of claim 1, wherein the configuration instruction comprises placement of a managed virtual machine by the VMM.

9. The apparatus of claim 1, wherein the respective power information received by the VMPM comprises a link utilization level of the at least one of plurality of network components.

10. The apparatus of claim 1, wherein the respective power information received by the VMPM comprises operational characteristics of the plurality of network components.

11. The apparatus of claim 10, wherein the operational characteristics comprise a supported link rate or a mode of operation available to the plurality of network components.

12. The apparatus of claim 1, wherein the respective power information received by the VMPM comprises a characteristic of a link between the plurality of network components.

13. The apparatus of claim 12, wherein the characteristic of the link between the plurality of network components comprises a size of bursts on the link, a time between bursts on the link, or an idle time on the link.

14. The apparatus of claim 1, wherein the respective power information received by the VMPM comprises energy control policies applied to the plurality of network components.

15. The apparatus of claim 14, wherein the energy control policies applied to the plurality of network components comprise respective link utilization thresholds.

16. The apparatus of claim 1, wherein the configuration instructions comprise a direction as to placement of a virtual machine managed by the VMM.

17. The apparatus of claim 1, wherein at least one of the plurality of network components is a network switch.

18. The apparatus of claim 1, wherein at least one of the plurality of network components is a port on a host.

19. The apparatus of claim 1, wherein at least one of the plurality of network components is a virtual port in a virtual machine on a host.

20. The apparatus of claim 1, wherein the VMPM receives the respective power information from a port profile database.

21. A method of managing energy efficiency and control mechanisms in a network having a virtual machine shared by a plurality of network components, the method comprising:
   receiving, at a virtual machine power manager (VMPM), respective power information from the plurality of network components;
   analyzing the respective power information;
   generating a configuration instruction based on the analyzing of the respective power information;
   sending the configuration instruction to a virtual machine manager (VMM) that is configured to manage the virtual machine, so as to configure the virtual machine to function in accordance with the analyzed respective power information; and
   updating the configuration instruction in response to a change in the respective power information for at least one of the plurality of network components.

22. The method of claim 21, further comprising:
   receiving component information from the VMM; and
   sending the component information to the plurality of network components.

23. The method of claim 21, wherein the configuration instruction comprises routing instructions or switching instructions for traffic on the network associated with the virtual machine.

24. The method of claim 23, wherein the configuration instruction comprises a specific traffic path to be taken with respect to the plurality of network components.

25. The method of claim 21, wherein the configuration instruction is based on respective energy control policies for controlling energy efficiency and control mechanisms on the plurality of network components.

26. The method of claim 25, wherein the energy efficiency and control mechanisms include Energy Efficient Ethernet (EEE) control policies.

27. The method of claim 21, wherein the configuration instruction comprises the, respective power information, and the VMM is configured to analyze the respective power information.

* * * * *

UNITED STATES PATENT AND TRADEMARK OFFICE
CERTIFICATE OF CORRECTION

| | | |
|---|---|---|
| PATENT NO. | : 9,009,499 B2 | Page 1 of 1 |
| APPLICATION NO. | : 12/813072 | |
| DATED | : April 14, 2015 | |
| INVENTOR(S) | : Wael William Diab | |

It is certified that error appears in the above-identified patent and that said Letters Patent is hereby corrected as shown below:

In the Claims

Column 12, line 56, Claim 1, please replace "respective, power" with --respective power--.

Signed and Sealed this
Twenty-eighth Day of July, 2015

Michelle K. Lee
*Director of the United States Patent and Trademark Office*